US009737924B2

(12) United States Patent
Kim et al.

(10) Patent No.: US 9,737,924 B2
(45) Date of Patent: Aug. 22, 2017

(54) EXTERIOR DÉCOR PANEL FOR HOME APPLIANCE AND APPARATUS OF MANUFACTURING THE SAME

(71) Applicant: LG Electronics Inc., Seoul (KR)

(72) Inventors: Dongjin Kim, Seoul (KR); Taihun Lim, Seoul (KR); Seonkyu Kim, Seoul (KR); Bonghyang Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 233 days.

(21) Appl. No.: 14/533,315

(22) Filed: Nov. 5, 2014

(65) Prior Publication Data

US 2015/0158074 A1 Jun. 11, 2015

(30) Foreign Application Priority Data

Nov. 8, 2013 (KR) ........................ 10-2013-0135451

(51) Int. Cl.

| | |
|---|---|
| ***B23P 9/00*** | (2006.01) |
| ***B21H 8/00*** | (2006.01) |
| ***B44C 1/24*** | (2006.01) |
| ***B21B 1/22*** | (2006.01) |
| ***B21B 27/00*** | (2006.01) |
| ***B21B 27/02*** | (2006.01) |
| ***B44B 5/00*** | (2006.01) |
| ***B44C 5/04*** | (2006.01) |
| *A47B 96/20* | (2006.01) |

(52) U.S. Cl.

CPC ............. *B21H 8/005* (2013.01); *B21B 1/227* (2013.01); *B21B 27/005* (2013.01); *B21B 27/021* (2013.01); *B44B 5/0047* (2013.01); *B44C 1/24* (2013.01); *B44C 5/0415* (2013.01); *A47B 2096/208* (2013.01); *Y10T 428/12201* (2015.01)

(58) Field of Classification Search

CPC . B21B 1/227; B21B 27/005; A47B 2096/208; Y10T 428/12201

See application file for complete search history.

(56) References Cited

U.S. PATENT DOCUMENTS

| | | | | |
|---|---|---|---|---|
| 2,277,725 A | 3/1942 | Smith et al. | | |
| 3,040,799 A | 6/1962 | Hanson | | |
| 2004/0149142 A1 * | 8/2004 | Groll | A47J 37/01 | 99/426 |
| 2009/0202856 A1 * | 8/2009 | Hiraoka | B21D 13/04 | 428/604 |

FOREIGN PATENT DOCUMENTS

DE 2356243 A1 1/1975

OTHER PUBLICATIONS

Search Report dated May 11, 2015 from corresponding European Patent Application No. 14191835.9, 9 pages.

* cited by examiner

*Primary Examiner* — Daniel J Schleis

(74) *Attorney, Agent, or Firm* — Fish & Richardson P.C.

(57) ABSTRACT

An exterior décor panel for a home appliance includes a metal sheet having a first surface and a second surface opposite the first surface. The metal sheet includes a first patterned portion having successive recesses formed in the first surface, where each of the successive recesses have a prescribed depth, and a second patterned portion having successive protrusions formed at the second surface, where the successive protrusions correspond to the successive recesses. The successive recesses are formed by applying a force to the first surface, thereby transferring the force to the second surface to form the successive protrusions.

9 Claims, 8 Drawing Sheets

EXTERIOR DÉCOR PANEL FOR HOME APPLIANCE AND APPARATUS OF MANUFACTURING THE SAME

CROSS-REFERENCE TO RELATED APPLICATION

Pursuant to 35 U.S.C. §119(a), this application claims the benefit of Korean Patent Application No. 10-2013-0135451, filed on, Nov. 8, 2013, which is hereby incorporated by reference as if fully set forth herein.

TECHNICAL FIELD

The present application relates to an exterior décor panel for a home appliance and an apparatus of manufacturing the same.

BACKGROUND

For manufacturing of metal sheets used as exterior décor panels for home appliances, there are various methods of forming a pattern to provide surfaces of the metal sheets with aesthetic effects, such as film attachment, printing, etching, rolling, and the like.

Among the aforementioned methods, in the case of rolling using a roller provided with a convex stereoscopic pattern, when a metal sheet passes through a rolling apparatus, a stereoscopic pattern is formed at a front surface of the metal sheet.

FIG. 1, for example, illustrates a method of forming a pattern at a front surface of a metal sheet by rolling the front surface. As shown, a metal sheet 1' having a fine stereoscopic pattern at a front surface thereof is manufactured by rolling a metal sheet 1" using a rolling apparatus 300 including an upper roller 310 provided with a rolling mold 200 and a lower dummy roller 320 supporting the metal sheet 1". Considerably great rolling pressure within a range of about 1 ton to 10 tons is vertically applied from the upper roller 310 and the lower dummy roller 320 to the metal sheet 1" to be rolled.

In the above-described rolling apparatus 300, the upper roller 310 provided with the rolling mold 200 is positioned to face the front surface of the metal sheet 1" to form a stereoscopic pattern on the front surface of the metal sheet 1" by rolling. In this case, no pattern is formed at a rear surface of the metal sheet 1" because the lower dummy roller 320 located to face the rear surface of the metal sheet 1" is not provided with a pattern.

As illustrated in FIG. 1, a thickness of the metal sheet 1' having passed through the rolling apparatus 300 is visibly reduced so as to be distinguished by the naked eye because considerably great rolling pressure of about 10 tons is applied to the metal sheet 1". For example, in order to provide the rolled metal sheet with a thickness of about 0.60 mm, an original thickness of the raw metal sheet may be about 0.63 mm.

SUMMARY

Accordingly, the present application is directed to an exterior décor panel for a home appliance and an apparatus of manufacturing the same.

One object of the present application is to provide an exterior décor panel for a home appliance and an apparatus of manufacturing the same in which a first patterned portion is recessed in a rear surface of a metal sheet such that a second patterned portion corresponding to a transfer pattern of the resulting rear surface pattern protrudes from a front surface of the metal sheet.

Additional advantages, objects, and features will be set forth in part in the description which follows and in part will become apparent to those having ordinary skill in the art upon examination of the following or may be learned from practice. The objectives and other advantages may be realized and attained by the structure particularly pointed out in the written description and claims hereof as well as the appended drawings.

According to one aspect, an exterior décor panel for a home appliance includes a metal sheet having a first surface and a second surface opposite the first surface. The metal sheet includes a first patterned portion having successive recesses formed in the first surface, where each of the successive recesses have a prescribed depth, and a second patterned portion having successive protrusions formed at the second surface, where the successive protrusions correspond to the successive recesses. The successive recesses are formed by applying a force to the first surface, thereby transferring the force to the second surface to form the successive protrusions Implementations of this aspect may include one or more of the following features. For example, the first patterned portion may define lines that interconnect maximum depth points of the successive recesses, where each of the lines of the first patterned portion have a prescribed depth and width, and the second patterned portion may define lines that interconnect maximum height points of the successive protrusions, where each of the lines of the second patterned portion have a prescribed height and width. A maximum height of the protrusions protruding from the second surface of the metal sheet may be less than a maximum depth of the recesses formed in the first surface of the metal sheet. The width of each of the protrusions may be greater than the width of each of the recesses. The second patterned portion may include curved portions of the protrusions and a flat portion between the curved portions between neighboring lines of the second patterned portion. The second patterned portion may include at least two lines that cross each other. The recesses may be formed by laser processing. The second patterned portion may have beginning and end points located at a rim of the metal sheet. The metal sheet may be formed of stainless steel or aluminum.

According to another aspect, a method for manufacturing an exterior décor panel for a home appliance, where the panel includes a metal sheet having a first surface and a second surface opposite the first surface, includes rolling the metal sheet between a pair of first and second rollers. The method further includes applying a force, via the pair of rollers, to the first surface to form a first patterned portion having successive recesses. Each of the successive recesses have a prescribed depth. The force applied to the first surface is transferred to the second surface to form a second patterned portion having successive protrusions at the second surface that correspond to the successive recesses. The first patterned portion defines lines that interconnect maximum depth points of the successive recesses, each of the lines of the first patterned portion having a prescribed depth and width. The second patterned portion defines lines that interconnect maximum height points of the successive protrusions, each of the lines of the second patterned portion having a prescribed height and width.

Implementations of this aspect may include one or more of the following features. For example, rolling the metal sheet between the pair of rollers may include rolling the metal sheet between the first roller having a protruding pattern corresponding to the first patterned portion in the form of the recesses and serving to press the first surface of the metal sheet, and the second roller that is configured to support the second surface of the metal sheet. Rolling the metal sheet between the pair of rollers may include rolling the metal sheet between the first roller and the second roller that is elastically deformable to allow the recesses to be transferred to the second surface of the metal sheet so as to form the protrusions. The method may further include rolling the metal sheet between one or more additional pairs of rollers, the pair of rollers and the one or more additional pairs of rollers having different protruding patterns from each other. The second patterned portion may include crossing lines that are formed sequentially as the metal sheet sequentially passes through the pair of rollers and the one or more additional pairs of rollers. Applying the force may form the second patterned portion to include lines that have beginning and end points located inside a rim of the metal sheet. Applying the force may form the second patterned portion to include lines that define a closed figure.

According to yet another aspect, an apparatus for manufacturing an exterior décor panel for a home appliance includes a first pair of rollers. The first pair of rollers include a first roller having a protruding pattern at a circumferential surface thereof, the first roller being configured to press a metal sheet so as to form recesses in a first surface of the metal sheet, and a second roller configured to support the metal sheet at an opposite side of the first roller so as to allow formation of protrusions corresponding to the recesses at a second surface of the metal sheet opposite the first surface.

Implementations of this aspect may include one or more of the following features. For example, the second roller may be formed of a material that is elastically deformable by a prescribed degree during rolling. The first roller may include a pattern in the form of protruding lines each having a prescribed height and width to form the recesses. The apparatus may further include a second pair of rollers, where the first and second pairs of rollers have different protruding patterns from each other. As the metal sheet sequentially passes through the first and second pairs of rollers, the first pair of rollers may be configured to form a first set of lines, and the second pair of rollers may be configured to form a second set of lines that cross the first set of lines.

The details of one or more implementations described in this specification are set forth in the accompanying drawings and the description below. Other potential features and aspects of the present application will become apparent from the descriptions, the drawings and the claims.

DETAILED DESCRIPTION

Figure 2:
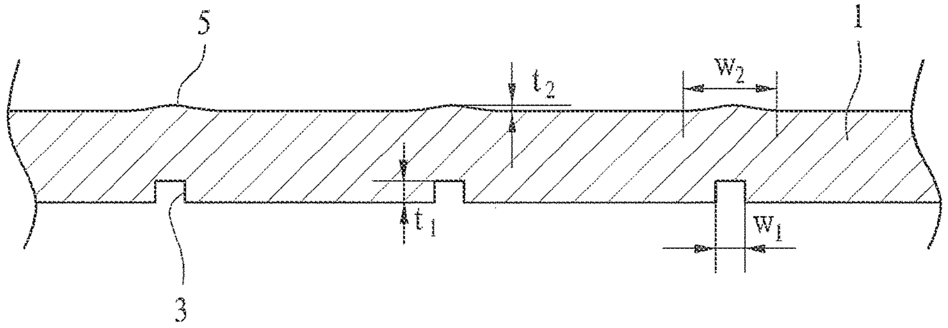
FIG. 2 is a partial sectional view illustrating the cross section of an example exterior décor panel for a home appliance manufactured according to one implementation.

FIG. 2 illustrates the cross section of an exterior décor panel for a home appliance manufactured according to an implementation of the present application. The exterior décor panel includes a first patterned portion 3 including successive recesses formed in a first surface of a metal sheet 1 having a prescribed thickness and a second patterned portion 5 including successive protrusions formed on a second surface of the metal sheet via transfer of the successive recesses. Here, a surface of the metal sheet 1 to be patterned in the case of using the metal sheet 1 as an exterior décor panel is the front surface of the metal sheet 1 provided with the second patterned portion 5.

To form the second patterned portion 5, press force may be applied to the rear surface of the metal sheet 1 to form the recesses. As a result, curved protrusions corresponding to the first patterned portion 3 can be formed at the front surface of the metal sheet 1 as the first patterned portion 3 is transferred from the rear surface to the front surface of the metal sheet 1. That is, the curved protrusions are formed as the press force applied to form the recesses is transferred to the front surface of the metal sheet due to the ductility of the metal sheet.

The successive recesses formed in the first surface (rear surface) of the metal sheet 1 can have a prescribed depth and width. As a result, the first patterned portion 3 can be defined by lines interconnecting the maximum depth points of the successive recesses having the prescribed depth and width.

The successive protrusions protrude from the second surface (front surface) of the metal sheet 1 and can have a prescribed height and width. As a result, the second patterned portion 5 can be defined by lines interconnecting the maximum height points of the successive protrusions having the prescribed height and width.

As exemplarily shown in FIG. 2, the first patterned portion 3 may be defined by continuous lines in the form of recesses, and each continuous line may have a prescribed depth $t_1$ and a prescribed width $w_1$.

Although each continuous line of the first patterned portion 3 is shown as having a rectangular recess shaped cross section, each recess of the first patterned portion 3 may have any of various other shapes, such as a rounded rectangular, trapezoidal or semicircular shape, for example.

The second patterned portion 5 corresponding to the first patterned portion 3, formed as the first patterned portion 3 is transferred, includes curved protrusions protruding from the front surface of the metal sheet 1 at positions corresponding to the respective recesses of the first pattern portion 3. As a result, the curved protrusions of the second patterned portion 5 may have finely convex rounded surfaces. In some cases, the rounded surface of each curved protrusion may be symmetrical about the center maximum height point of the curved protrusion. In some cases, a flat portion may be present between the respective neighboring curved protrusions that are spaced apart from each other by a prescribed distance.

One reason why the second patterned portion 5 includes the curved protrusions having the rounded surfaces differently from the first patterned portion 3 is that, when the press force applied to the rear surface of the metal sheet 1 to form the first patterned portion 3, the press force is transferred to the front surface of the metal sheet 1 to thereby form the protrusions corresponding to the first patterned portion 3. This will be described below in more detail.

While the curved protrusions of the second patterned portion 5 can have gently protruding rounded surfaces, as exemplarily shown in FIG. 2, the protrusions can be characterized by a maximum height $t_2$ and a width $w_2$. Here, the maximum height $t_2$ of the protrusions refers to a height of the highest point of each protrusion protruding from the front surface of the metal sheet 1, and the width $w_2$ of the protrusions refers to a width between protrusion start points of opposite edges of one protrusion of the second patterned portion 5.

As illustrated, the maximum height $t_2$ of the protrusions is less than the maximum depth of the recesses formed in the rear surface of the metal sheet 1. In some cases, the maximum height $t_2$ of the protrusions of the second patterned portion 5 may be within a range of 15 microns to 20 microns.

When a thickness of the metal sheet 1 is 0.6 mm, the depth $t_1$ and the width $w_1$ of the recesses of the first patterned portion 3 may respectively be within a range of 0.1 mm to 0.2 mm. In this case, the maximum height $t_2$ of the protrusions of the second patterned portion 5 may be within a range of 15 microns to 20 microns.

Since the protrusions of the second patterned portion 5 can have an extremely small height and have convex rounded surfaces, a person who touches the front surface of the metal sheet 1 may not be able to tactilely perceive the presence of the protrusions. However, a stereoscopic pattern of the second patterned portion 5 may be visible to the person.

In addition, the width $w_2$ of the protrusions between the protrusion start points of each protrusion protruding from the front surface of the metal sheet 1 may be greater than the width $w_1$ of the recesses. In some cases, the width $w_2$ of the protrusions may be two to four times greater than the width $w_1$ of the recesses.

The second patterned portion 5 is formed as the first patterned portion 3 being formed at the rear surface of the metal sheet 1 is transferred to the front surface of the metal sheet 1. Therefore, the protrusions of the second patterned portion 5 achieve a form having a small height and a great width relative to the first patterned portion 3.

Figure 3A:
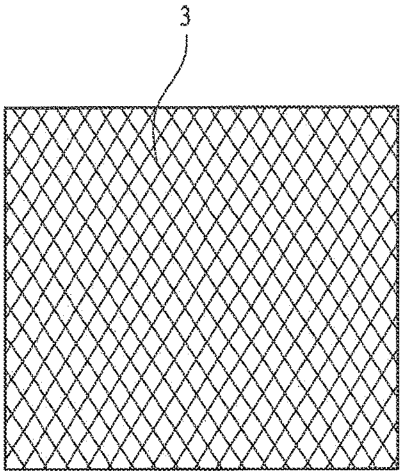
FIGS. 3A and 3B are plan views respectively illustrating a first patterned portion formed at a rear surface of a metal sheet and a second pattern portion formed at a front surface of the metal sheet according to the implementation of FIG. 2.

Although the recesses of the first patterned portion 3 and the protrusions of the second patterned portion 5 corresponding thereto are shown in FIG. 3 as having a diamond shape, the shape of the protrusions and the recesses is not limited thereto.

A contour acquired by connecting the maximum height points of the protrusions may be a linear contour. That is, the protrusions of the second patterned portion 5 may be defined by a plurality of lines successively formed at the front surface of the metal sheet 1.

The protrusions of the second patterned portion 5 may take the form of a polygon, such as a rectangle, a hexagon or the like, defined by lines crossing each other, may take the form of a closed figure, such as a circle, an oval, a polygon or the like, defined by lines not crossing each other, or may take the form of symbols or characters.

As described above, the protrusions of the second patterned portion 5 can have rounded surfaces differently from the first patterned portion 3.

FIG. 3 illustrates an example of the first patterned portion 3 that may be formed at the rear surface of the metal sheet 1 and the second patterned portion 5 that may be correspondingly formed at the front surface of the metal sheet 1 as a result.

Figure 3B:
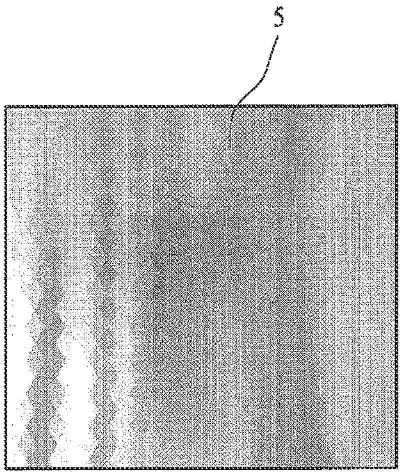

Referring to FIG. 3B, the first patterned portion 3 defines a pattern of a plurality of continuous lines in the form of recesses having a prescribed width and depth. The first patterned portion 3 may be defined by arbitrary straight lines or curved lines, and these arbitrary lines may cross each other.

The second patterned portion 5 defines a pattern of lines interconnecting the maximum height points of the protrusions and, therefore, takes the form of a figure corresponding to the first patterned portion 3. For example, the lines may include parallel continuous lines extending in a given direction and parallel continuous lines extending in a direction angled from the given direction, and these parallel continuous lines extending in different directions may cross each other at a prescribed angle to internally define a closed figure, such as a diamond.

The second patterned portion 5, as exemplarily shown in the picture of FIG. 3B, is formed as the diamond pattern defined by the continuous lines of the first patterned portion 3 is transferred, and each continuous line is viewed as being formed by connecting a plurality of diamonds.

Figure 4A:
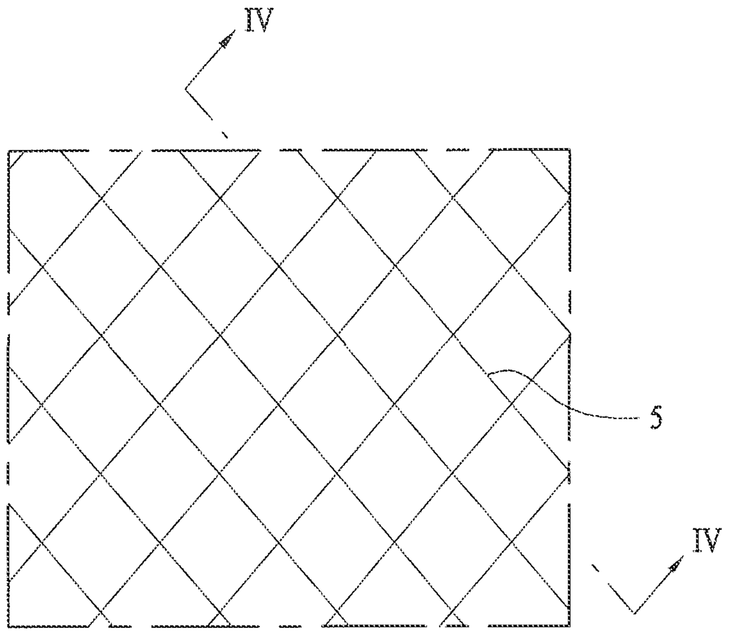
FIGS. 4A and 4B, respectively, are a plan view and a sectional view illustrating the second patterned portion.

As exemplarily shown in FIG. 4A, by interconnecting the maximum height points of the protrusions of the second patterned portion 5, a diamond pattern defined by a plurality of lines crossing each other may be acquired. The lines crossing each other, which define the protrusions of the second patterned portion 5, may be acquired by sequentially formed portions of lines not crossing each other. This will be described below in more detail.

Figure 4B:
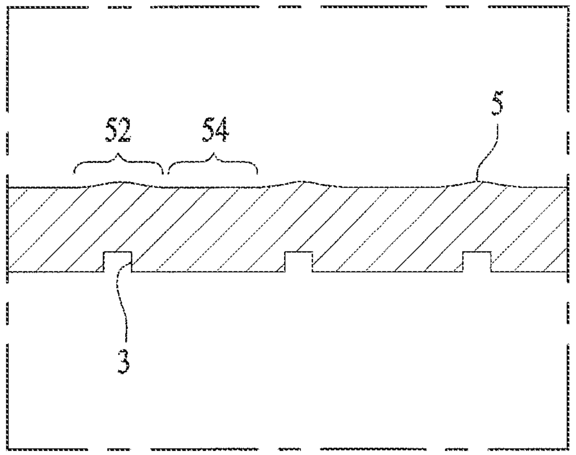

As exemplarily shown in FIG. 4B in a cross sectional view taken along line IV-IV of FIG. 4A, the contour of the front surface of the metal sheet 1 may be defined by flat portions 54 and curved portions 52, each curved portion 52 being gradually reduced in height in opposite directions from the line that interconnects the maximum height points of the protrusions and extending to the respective neighboring flat portions 54. That is, two protruding curved portions 52 and one flat portion 54 between the curved portions 52 may be present between the neighboring two lines of the second patterned portion 5.

The flat portions 54 may not be affected by the press force applied to form the recesses in the rear surface of the metal sheet 1 and thus do not protrude from the front surface of the metal sheet 1. The curved portions 52 are formed as the recesses of the first patterned portion 3 being formed at the rear surface of the metal sheet 1 are transferred to the front surface of the metal sheet 1 and thus protrude from the front surface of the metal sheet 1.

The second patterned portion 5 can be formed by interconnecting maximum height points of the curved portions 52, and half portions of the two curved portions 52 and the flat portion 54 can be arranged between two lines of the second patterned portion 5. The flat portion 54 may be formed between the curved portions 52 and a width of the flat portion 54 may be determined according to a distance between the neighboring curved portions 52. The flat portions 54 may disappear when a distance between the recesses formed in the rear surface of the metal sheet 1 is reduced. However, the flat portions 54 are preferably formed along with the curved portions 52. The metal sheet 1 may be formed of stainless steel, aluminum, or the like.

The exterior décor panel of the present application has a pattern integrally formed at a front surface thereof via rolling of a rear surface thereof and can be used to be attached to a home appliance. The resulting exterior décor panel can have greater durability and ease of manufacture.

Stainless steel has less ductility than aluminum and thus may have lower processing ability, but can have greater strength and durability than aluminum.

A rolling apparatus may typically apply rolling pressure of about 10 tons upon rolling of a front surface of a stainless steel sheet. On the other hand, according to the present application, a fine pattern may be sufficiently formed at a front surface of a stainless steel sheet upon rolling of a rear surface of the stainless steel sheet by applying only rolling pressure of 100 kgf.

In the case of an aluminum sheet having superior ductility, rolling thereof may be possible via application of an even lower rolling pressure than that applied to the stainless steel sheet during rolling. Additionally, since the aluminum sheet may be easily subjected to plastic deformation when a fine pattern is formed at a front surface of the aluminum sheet via rolling of a rear surface of the aluminum sheet, it may be necessary to reduce a width and depth of recesses corresponding to the resulting rear surface pattern as well as rolling pressure applied to the rear surface as compared to those of the stainless steel sheet.

In some cases, the metal sheet 1 may be subjected to bright annealing after rolling to acquire a brilliant surface.

The second patterned portion 5 formed at the front surface of the metal sheet 1 can include the protrusions having the finely convex rounded surfaces almost close to a flat surface because the maximum height of the protrusions is within a range of 15 microns to 20 microns. Accordingly, by bright annealing the front surface of the metal sheet 1 after rolling, the second patterned portion 5 may provide a more conspicuous stereoscopic pattern.

Since the second patterned portion 5 including the protrusions having the finely convex rounded surfaces can reflect light at different angles according to positions of the protrusions, when the front surface of the metal sheet 1 is brilliant, as exemplarily shown in FIG. 3B, the second patterned portion 5 may exhibit different colors of patterns at different positions.

The exterior décor panel of the present application may be used as an exterior material to be attached to an exterior surface of a home appliance. The present application may be applied to any home appliance so long as the home appliance allows such a patterned exterior material formed of a metal sheet to be attached to an exterior surface thereof.

Examples of home appliances to which the present application may be applied include a refrigerator, a washing machine, a drying machine, a blow dryer, a dishwasher, an air conditioner, a television, a cellular phone and many others.

In particular, in the case of a refrigerator, the exterior décor panel may be attached to a front surface of a door and thus have a large size. Even in the case of such a large size exterior décor panel, a stereoscopic pattern may be economically and precisely formed at a front surface of a metal sheet via rolling of a rear surface of the metal sheet according to the present application.

Next, an apparatus and method of manufacturing an exterior décor panel for a home appliance via rolling according to the present application will be described with reference to FIGS. 5 to 9B.

Figure 5:
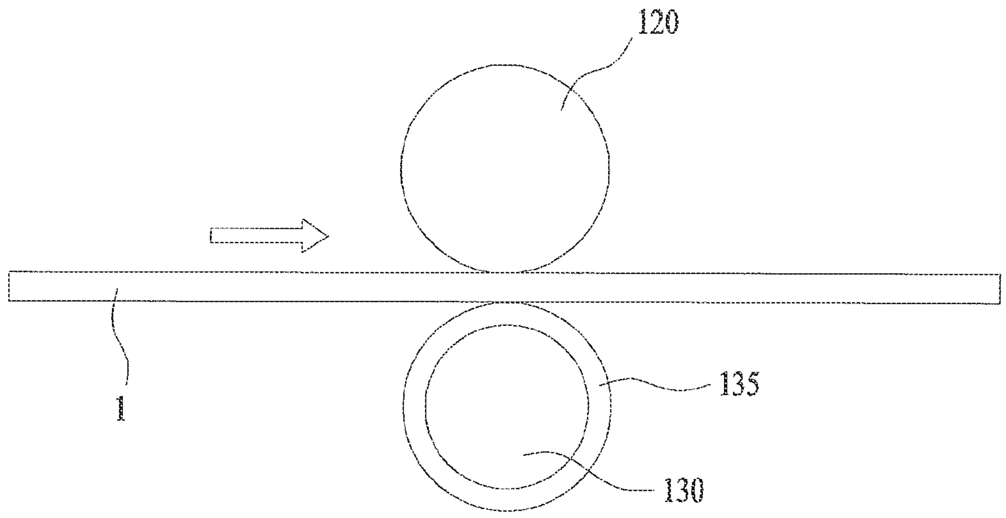
FIG. 5 is a schematic view illustrating an example process of rolling the rear surface of the metal sheet to form a pattern at the front surface of the metal sheet.

FIG. 5 illustrates a rolling process of forming a pattern at the front surface of the metal sheet by rolling the rear surface of the metal sheet according to the present application.

The apparatus of manufacturing the exterior décor panel for the home appliance according to the present application includes at least one pair of rollers consisting of a first roller 120 having a protruding pattern formed at a circumferential surface thereof to form recesses in a first surface of the metal sheet 1 by pressing the metal sheet 1 and a second roller 130 configured to support the metal sheet 1 at the opposite side of the first roller 120 to form protrusions corresponding to the recesses at a second surface of the metal sheet 1.

The first roller 120 serves to perform rolling on the first surface, i.e. a rear surface of the metal sheet 1 to be rolled. As exemplarily shown in FIG. 6, the first roller 120 is provided at the circumferential surface thereof with a protruding pattern P to form the first patterned portion 3 at the rear surface of the metal sheet 1. The second roller 130 has no pattern and serves to support the front surface of the metal sheet 1 during rolling of the metal sheet 1. The second roller 130 may accordingly be formed of a material that will be elastically deformed by a prescribed degree during rolling.

When the first roller 120 performs rolling on the rear surface of the metal sheet 1, the second roller 130 may be elastically deformed while supporting the front surface of the metal sheet 1. Accordingly, as the pattern of the first roller 120 is transferred to the front surface of the metal sheet 1, the second patterned portion 5 including the rounded protrusions can be formed.

Although the second roller 130 may be wholly formed of an elastically deformable material, an elastic deformable portion 135 formed of a rubber or the like may surround a steel rod to achieve sufficient strength to endure rolling pressure. The elastic deformable portion 135 can absorb deformation of the protrusions that are formed at the front surface of the metal sheet 1 while the recesses are formed in the rear surface of the metal sheet 1. That is, the elastic deformable portion 135 can allow the protrusions, which do not have the same shape as the recesses but have a shape corresponding to the recesses, to be formed at the front surface of the metal sheet 1.

While the first roller 120 having the protruding pattern performs rolling on the rear surface of the metal sheet 1 to form the recesses, the elastic deformable portion 135 can cause a pattern of the recesses to be transferred to the front surface of the metal sheet 1 so as to form the protrusions of the second patterned portion 5.

As described above, the elastic deformable portion 135 can form the protrusions having a height less than a depth of the recesses and a width greater than a width of the recesses. The elastic deformable portion 135 may be manufactured to achieve an appropriate coefficient of elasticity and an appropriate thickness to provide the protrusions with a desired stereoscopic shape.

Figure 1:
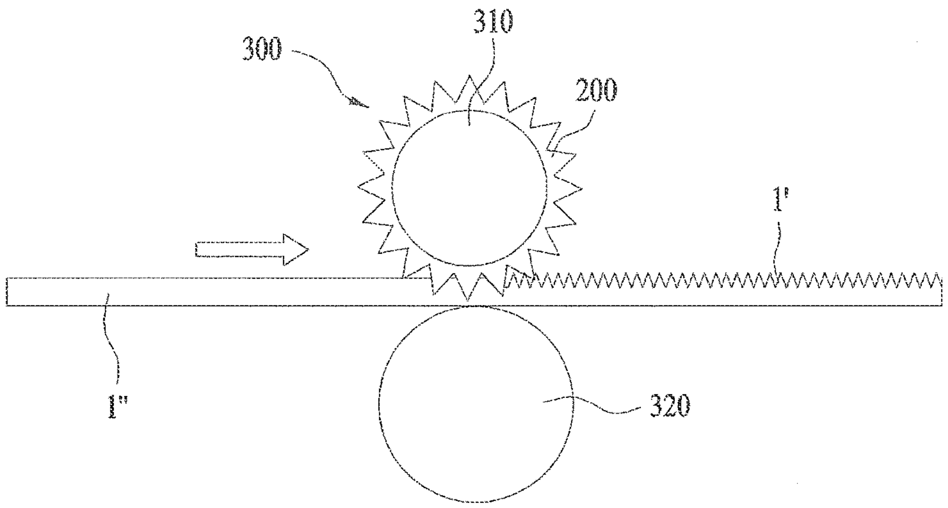
FIG. 1 is a schematic view illustrating an example process of rolling a front surface of a metal sheet.

The rolling apparatus shown in FIG. 1, for example, needs to vertically apply rolling pressure from both the upper and lower rollers, whereas the rolling apparatus of the present application as shown in FIG. 5 may apply rolling pressure only from the first roller 120 that performs rolling on the rear surface of the metal sheet 1.

And while conventional rolling apparatus may need to apply rolling pressure of about 10 tons and require installation of one or more intermediate rollers and a plurality of backup rollers in order to directly applying rolling pressure to a working roller, the rolling apparatus of the present application as shown in FIG. 5 can have a reduced number of rollers and may be reduced in size. Accordingly, the rolling apparatus of the present application may have a simpler configuration and smaller size than conventional rolling apparatuses.

Figure 6:
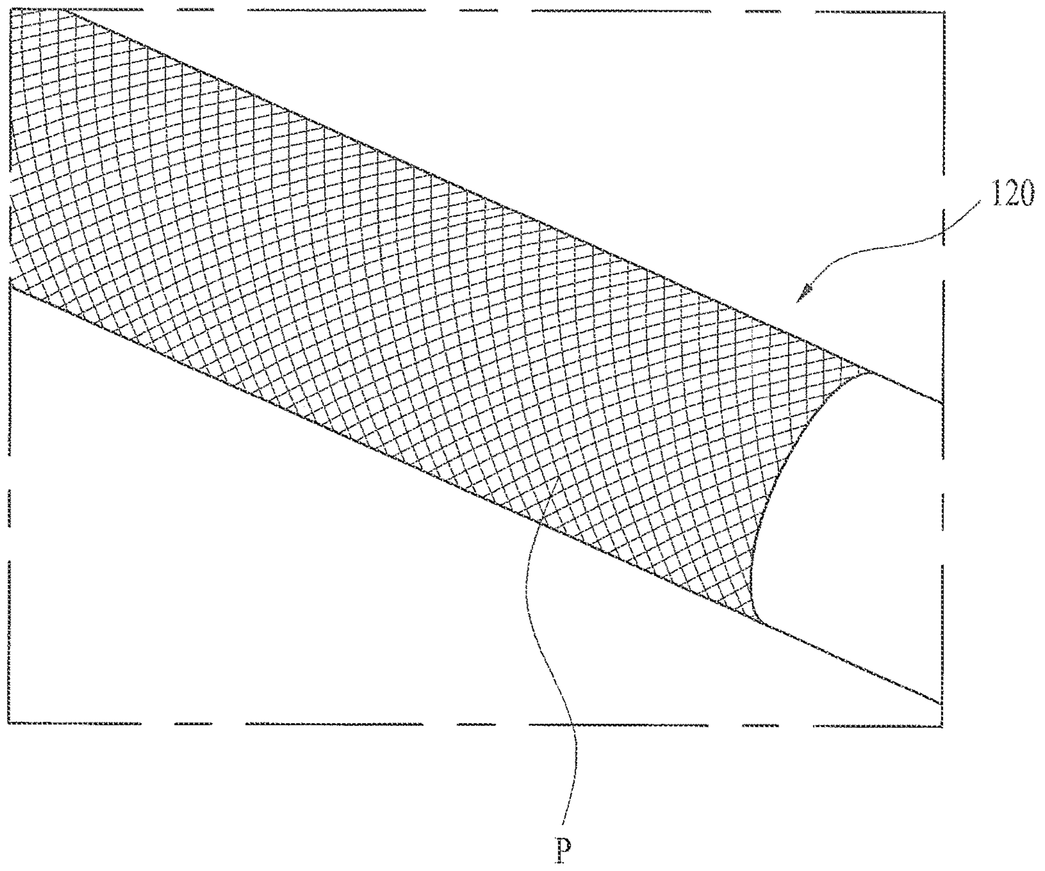
FIG. 6 is a partial perspective view illustrating a first roller of FIG. 5.

As exemplarily shown in FIG. 6, the protruding pattern P formed at the circumferential surface of the first roller 120 corresponds to the first patterned portion 3 to be formed at the rear surface of the metal sheet 1. The shown pattern P, as described above, may serve to form a pattern including a plurality of diamonds defined by a plurality of continuous lines crossing each other.

Through use of the pattern P, as exemplarily shown in FIG. 3, a pattern including a plurality of diamonds defined by a plurality of first parallel continuous lines and a plurality of second parallel continuous lines crossing each other at a prescribed angle, may be formed at the rear surface of the metal sheet 1.

In the case of the pattern P, since rolling pressure is concentrated at intersections of the first and second continuous lines, the second patterned portion 5 as exemplarily shown in FIG. 4A may often cause an inaccurate pattern, such as a pattern in which excessively sharp protruding portions are formed at the intersections of the continuous lines.

For this reason, in the case in which the pattern P of the first roller 120 is defined by a plurality of continuous lines crossing each other as exemplarily shown in FIG. 6, two or more pairs of rollers having patterns defined by continuous lines not crossing each other may be used to sequentially perform rolling, for example two times or more.

Figure 7:
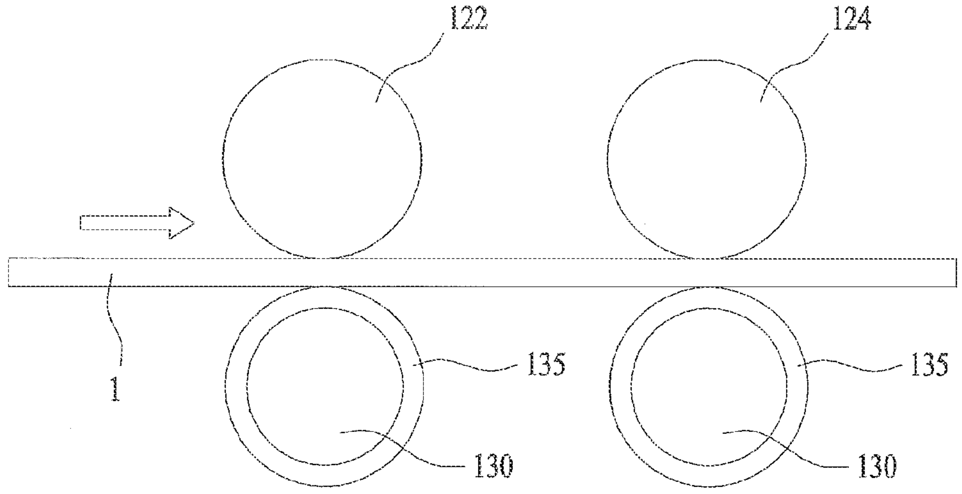
FIG. 7 is a schematic view illustrating an example rolling process using two pairs of rollers.

FIG. 7 illustrates a rolling process using two pairs of rollers respectively having patterns defined by continuous lines not crossing each other.

Figure 8A:
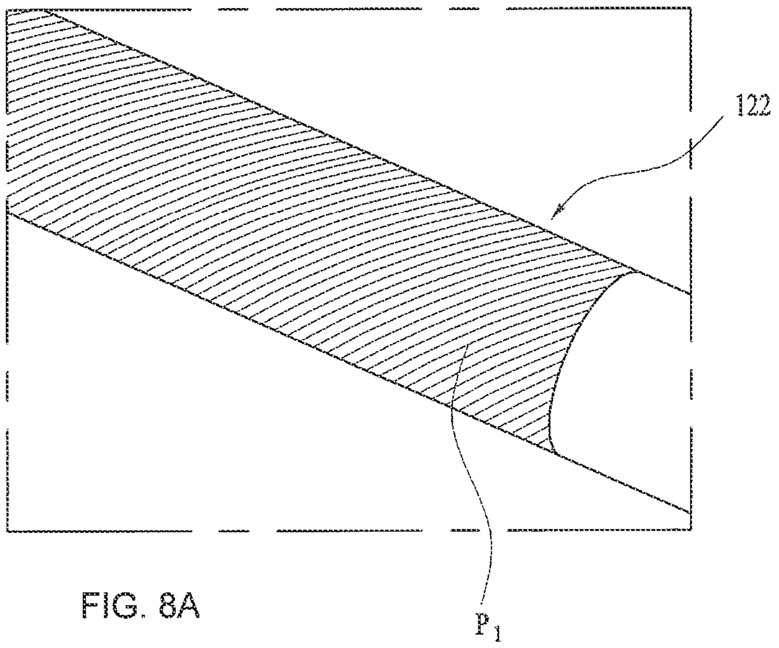
FIGS. 8A and 8B are partial perspective views respectively illustrating a first roller among each of the two pairs of rollers of FIG. 7.
Figure 8B:
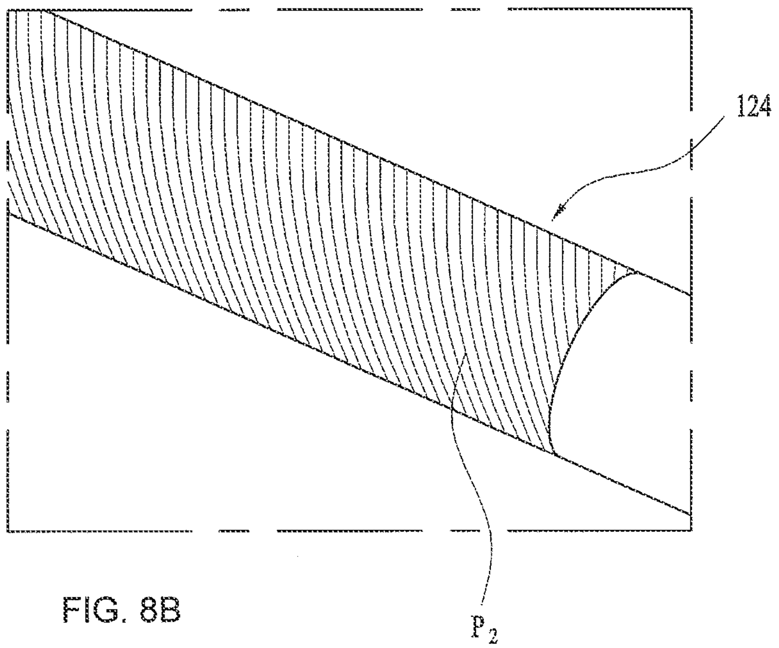

Referring to FIGS. 8A and 8B, two first rollers 122 and 124 each have a protruding pattern defined by a plurality of lines not crossing each other. The two pairs of rollers may respectively include a pair of the first roller 122 and the second roller 130 and a pair of the first roller 124 and the second roller 130, and the first roller 122 or 124 may have a protruding pattern defined by parallel lines as exemplarily shown in FIGS. 8A and 8B.

FIG. 8A shows the first roller 122 having a first pattern $P_1$ defined by first parallel continuous lines that are inclined to the left and downward with respect to a longitudinal direction of the roller 122, and FIG. 8B shows the first roller 124 having a second pattern $P_2$ defined by second parallel continuous lines that are inclined to the right and downward with respect to a longitudinal direction of the roller 124.

In the case in which the first roller 122 and the first roller 124 have different protruding patterns and are used to form the diamond shaped first patterned portion 3 as illustrated, the rollers 122 and 124 may be provided with a plurality of different parallel protruding lines that extend in different direction to have a prescribed inclination angle.

The first roller 122 may form a pair with one second roller 130 to perform rolling, and the first roller 124 may form a pair with another second roller 130 to perform rolling. The second roller 130, as exemplarily shown in FIG. 7, may be manufactured by surrounding a steel rod with the elastic deformable portion 135 formed of a rubber or the like.

The first roller 122 and the first roller 124 may be spaced apart from each other to sequentially perform rolling on the metal sheet 1. Accordingly, protrusions in the form of a plurality of parallel lines, which may be part of the second patterned portion 5, may be formed in a given direction while the metal sheet 1 passes through a gap between the first roller 122 and the second roller 130 and, subsequently, protrusions in the form of a plurality of parallel lines crossing the previously formed parallel lines may be formed in an opposite direction while the metal sheet 1 passes through a gap between the first roller 124 and the second roller 130.

The first roller 122 and the first roller 124 can allow the metal sheet 1 to be sequentially subjected to rolling while passing the two first rollers 122 and 124 in a single rolling apparatus, thereby enabling formation of a precise pattern defined by continuous lines crossing each other.

In the case of FIGS. 7 and 8, when the number of lines forming one intersection is two, the metal sheet is subjected to rolling by sequentially passing through gaps between two pairs of rollers. In some cases when the number of lines forming one intersection is three, the metal sheet may be sequentially subjected to rolling using three or more pairs of rollers.

In some cases, as a method of forming the second patterned portion 5 protruding from the front surface of the metal sheet 1 by forming the first patterned portion 3 at the rear surface of the metal sheet 1, laser processing may be used. Laser processing refers to a method of directly drawing a figure with continuous lines by scanning the rear surface of the metal sheet 1 with a laser beam.

When the rear surface of the metal sheet 1 is scanned with the laser beam to form the recesses in the form of lines, the curved protrusions may be formed at the front surface of the metal sheet 1. In this case, scan beginning and end points of the laser beam, as exemplarily shown in FIG. 9A, are located at the outside of the surface of the metal sheet 1.

Figure 9A:
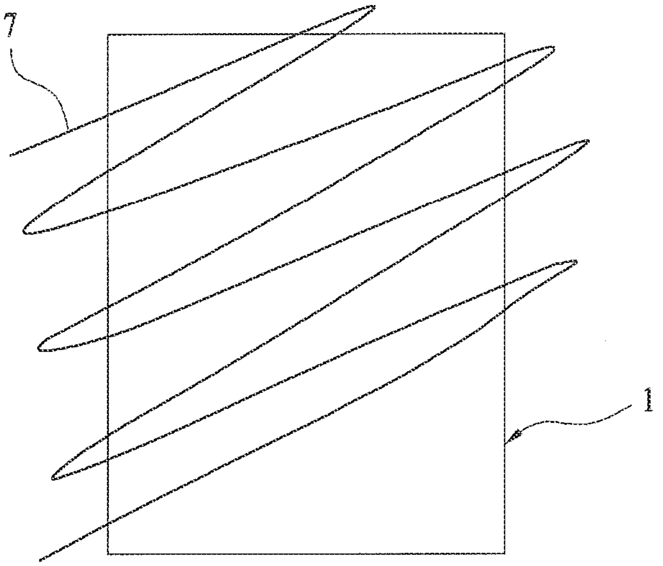
FIGS. 9A and 9B are plan views illustrating, respectively, laser beam movement paths associated with an example pattern that may be formed by laser processing and an example pattern that may not be formed by laser processing.

In FIG. 9A, a movement path 7 of the laser beam scanning the rear surface of the metal sheet 1 is shown as being linear. In the case of laser processing, a linear pattern can be achieved by moving a laser beam having a constant intensity at a constant speed. When scan beginning and end points of the laser beam are located at the surface of the metal sheet 1, portions of the metal sheet 1 corresponding to the beginning and end points may be excessively processed as compared to the remaining portion, thus causing an uneven pattern.

Consequently, through laser processing as described above, the resulting first patterned portion may have difficulty in having an accurate pattern in the form of a figure defined by lines, beginning and end points of which are present at the surface of the metal sheet 1. That is, laser processing can have difficulty in accurately forming a pattern in which beginning and end points of a movement path 8 of laser beam are located inside the rim of the metal sheet as exemplarily shown in FIG. 9B.

Figure 9B:
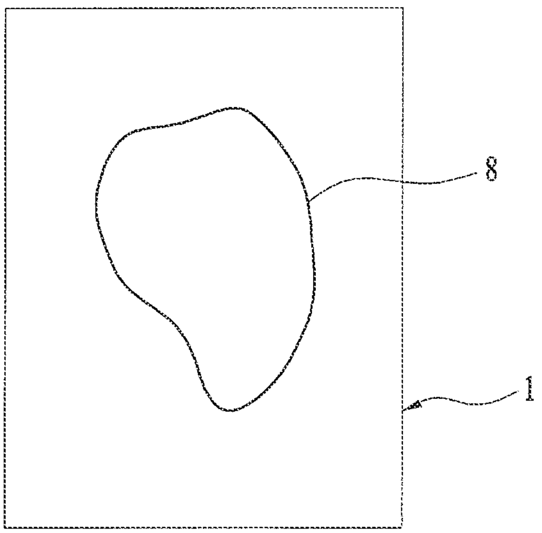

On the other hand, in the case in which a pattern is formed the an exterior décor panel by rear surface rolling as described above, beginning and end points of lines forming the first patterned portion may be located inside or outside of the surface of the metal sheet 1 and, therefore, both the patterns shown in FIGS. 9A and 9B may be formed.

In addition, laser processing needs to draw the lines of the first patterned portion one by one, thus causing deteriorated productivity and high manufacturing costs.

On the other hand, the case of rear surface rolling as described above, the lines of the first patterned portion may be simultaneously formed using the roller having a pattern corresponding to the first patterned portion and, therefore, rear surface rolling may achieve relatively high mass production yield and low manufacturing costs.

In addition, laser processing can have difficulty forming a precise pattern on a relatively soft metal, such as aluminum.

On the other hand, rear surface rolling may form a precise pattern on a relatively soft metal, such as aluminum, as well as a relatively strong metal, such as stainless steel via control of rolling pressure.

As is apparent from the above description, with an exterior décor panel for a home appliance and an apparatus of manufacturing the same according to the present application, the present application can have the effect of simplifying the manufacturing an exterior décor panel having a stereoscopic pattern formed at a front surface thereof, as a result of forming a recessed pattern in a rear surface of a metal sheet such that a pattern corresponding to the pattern of the rear surface is transferred to a front surface of the metal sheet.

In addition, the present application can have the effect of economically and precisely manufacturing an exterior décor panel having a fine protruding pattern formed at a front surface of the panel via processing of a rear surface of the panel.

In addition, the present application can have the effect of allowing a front surface pattern to appear to have different colors according to positions, as a result of providing a metal sheet with a brilliant surface via bright annealing after rolling of the metal sheet.

In addition, in the case of a front surface pattern being formed by lines via rear surface rolling, beginning and end points of the lines may be located at the rear surface or may define a closed figure at the rear surface, which enables formation of various shapes of patterns without limitation.

Although the exemplary implementations have been illustrated and described as above, of course, it will be apparent to those skilled in the art that the present application is not limited to the above described particular implementations, and various modifications and variations can be made in the present application without departing from the spirit or scope of the present application, and the modifications and variations should not be understood individually from the viewpoint or scope of the present application.

What is claimed is:

1. An exterior décor panel for a home appliance, the exterior décor panel comprising:

a metal sheet having a rear surface and a front surface opposite the rear surface, the metal sheet comprising:

a first patterned portion having successive recesses formed at the rear surface, each of the successive recesses having a first depth and a first width; and a second patterned portion having successive protrusions formed at the front surface, each of the successive protrusions corresponding to each of the successive recesses and having a second height and a second width, wherein the successive recesses are formed by applying a force to the rear surface, thereby transferring the force to the front surface to form the successive protrusions, wherein each of the recesses has an angular shaped cross section and each of the protrusions has a convex curve shape, wherein a maximum depth of the recesses at the rear surface is less than the thickness of the metal sheet and greater than a maximum height of the protrusions at the front surface, and wherein the second width of each protrusion is greater than the first width of each recess.

2. The panel according to claim 1, wherein:

the first patterned portion defines lines that interconnect maximum depth points of the successive recesses, each of the lines of the first patterned portion having a prescribed depth and width; and the second patterned portion defines lines that interconnect maximum height points of the successive protrusions, each of the lines of the second patterned portion having a prescribed height and width.

3. The panel according to claim 2, wherein the second patterned portion includes curved portions of the protrusions and a flat portion between the curved portions between neighboring lines of the second patterned portion.

4. The panel according to claim 2, wherein the second patterned portion includes at least two lines that cross each other.

5. The panel according to claim 2, wherein the recesses are formed by laser processing.

6. The panel according to claim 5, wherein the second patterned portion has beginning and end points located at a rim of the metal sheet.

7. The panel according to claim 1, wherein the metal sheet is formed of stainless steel or aluminum.

8. The panel according to claim 1, wherein the cross section of each of the recesses is rectangular shaped.

9. The panel according to claim 1, wherein the cross section of each of the recesses is trapezoidal shaped.

* * * * *